United States Patent
Hara et al.

[11] Patent Number: 5,872,574
[45] Date of Patent: Feb. 16, 1999

[54] IMAGE PROCESSING APPARATUS AND METHOD

[75] Inventors: Yuji Hara, Atsugi; Tatsuhiko Yamazaki, Isehara; Hayao Ohzu, Fuchu; Toshiaki Minami, Isehara, all of Japan

[73] Assignee: Canon Kabushiki Kaisha, Tokyo, Japan

[21] Appl. No.: 866,113

[22] Filed: May 30, 1997

[30] Foreign Application Priority Data

Jun. 5, 1996 [JP] Japan .................................. 8-142720

[51] Int. Cl.⁶ .................................................. G06F 15/00
[52] U.S. Cl. .............................................................. 345/441
[58] Field of Search ..................................... 345/440, 441, 345/142, 118, 121, 144, 467, 468, 169, 470

[56] References Cited

U.S. PATENT DOCUMENTS 5,751,294  5/1998  O'Brien, Jr. .............................. 345/440
5,764,239  6/1998  Misue et al. ............................. 345/441

FOREIGN PATENT DOCUMENTS

0182237A2  5/1986  European Pat. Off. .
0323558A2  7/1989  European Pat. Off. .

OTHER PUBLICATIONS

K. Nakashima, et al., "A High Speed Contour Fill Method For Character Image Generation", IEICE Transactions On Information And Systems, vol. E77–D, No. 7, Jul. 1994, pp. 832–837.

*Primary Examiner*—Phu K. Nguyen
*Attorney, Agent, or Firm*—Fitzpatrick, Cella, Harper & Scinto

[57] ABSTRACT

A minimum coordinate value at least in one direction of a parameter data group including a start point and an end point of a stroke is detected and outline coordinates are generated from the parameter data group by an outline coordinate generator and a minimum coordinate detector. An outline data generator stores range data indicative of a painting range into a predetermined address in an outline buffer on the basis of the outline coordinates and the minimum coordinate value or the maximum coordinate value. An address generator generates a drawing start address and an end address in a bit map memory in accordance with a value based on the minimum coordinate value and the predetermined address and with the range data. A painter paints by writing the same value into all data between the drawing start address and end address in the bit map memory, thereby generating a character pattern at a high speed by a buffer memory of a small capacity.

12 Claims, 23 Drawing Sheets

| y | START x | END x |
|---|---------|-------|
| 0 | 2 | 17 |
| 1 | 2 | 17 |
| 2 | 2 | 17 |
| 3 | 2 | 17 |
| 4 | | |
| 5 | | |
| 6 | | |
| 7 | | |
| 8 | | |
| 9 | | |

Tb

| y | START x | END x |
|---|---------|-------|
| 0 | 2 | 5 |
| 1 | 2 | 5 |
| 2 | 2 | 5 |
| 3 | 2 | 5 |
| 4 | 2 | 5 |
| 5 | 2 | 5 |
| 6 | 2 | 5 |
| 7 | 2 | 5 |
| 8 | 2 | 5 |
| 9 | 2 | 5 |

Tb1

Tb2

| y | START x | END x |
|---|---------|-------|
| 0 | 2 | 5 |
| 1 | 2 | 5 |
| 2 | 2 | 5 |
| 3 | 2 | 5 |
| 4 | 2 | 5 |
| 5 | 2 | 5 |
| 6 | | |
| 7 | | |
| 8 | | |
| 9 | | |

| y | START x | END x |
|---|---------|-------|
| 0 |         |       |
| 1 |         |       |
| 2 | 7       | 12    |
| 3 | 5       | 14    |
| 4 | 4       | 15    |
| 5 | 3       | 16    |
| 6 | 2       | 17    |
| 7 |         |       |
| 8 |         |       |
| 9 |         |       |

Tb2

| y | START x | END x |
|---|---------|-------|
| 0 |         |       |
| 1 |         |       |
| 2 | 6       | 12    |
| 3 | 6       | 12    |
| 4 | 6       | 12    |
| 5 | 6       | 12    |
| 6 | 6       | 12    |
| 7 | 6       | 12    |
| 8 | 6       | 12    |
| 9 |         |       |

| y | START x | END x |
|---|---------|-------|
| 0 |   |   |
| 1 |   |   |
| 2 | 2 | 5 |
| 3 | 2 | 5 |
| 4 | 2 | 5 |
| 5 | 2 | 5 |
| 6 | 2 | 5 |
| 7 | 2 | 5 |
| 8 | 2 | 5 |
| 9 | 2 | 5 |
| 10 | 2 | 5 |
| 11 | 2 | 5 |
| 12 | 2 | 5 |
| 13 | 2 | 5 |
| 14 | 2 | 5 |
| 15 | 2 | 5 |
| 16 | 2 | 5 |
| 17 | 2 | 5 |
| 18 |   |   |
| 19 |   |   |

| y | START x | END x |
|---|---------|-------|
| 0 |   |   |
| 1 |   |   |
| 2 |   |   |
| 3 |   |   |
| 4 |   |   |
| 5 |   |   |
| 6 |   |   |
| 7 |   |   |
| 8 | 2 | 17 |
| 9 | 2 | 17 |
| 10 | 2 | 17 |
| 11 | 2 | 17 |
| 12 |   |   |
| 13 |   |   |
| 14 |   |   |
| 15 |   |   |
| 16 |   |   |
| 17 |   |   |
| 18 |   |   |
| 19 |   |   |

| y | START x | END x |
|---|---------|-------|
| 0 |         |       |
| 1 |         |       |
| 2 | 15      | 17    |
| 3 | 15      | 17    |
| 4 | 15      | 17    |
| 5 | 15      | 17    |
| 6 | 15      | 17    |
| 7 | 15      | 17    |
| 8 | 15      | 17    |
| 9 | 15      | 17    |
| 10 | 15     | 17    |
| 11 | 15     | 17    |
| 12 | 15     | 17    |
| 13 | 15     | 17    |
| 14 | 15     | 17    |
| 15 | 15     | 17    |
| 16 | 15     | 17    |
| 17 | 15     | 17    |
| 18 |        |       |
| 19 |        |       |

Tb

| y | START x | END x |
|---|---------|-------|
| 0 |         |       |
| 1 |         |       |
| 2 | 2       | 5     |
| 3 | 2       | 5     |
| 4 | 2       | 5     |
| 5 | 2       | 5     |
| 6 | 2       | 5     |
| 7 | 2       | 5     |
| 8 | 2       | 5     |
| 9 | 2       | 5     |

Tb

| y | START x | END x |
|---|---------|-------|
| 0 | 2 | 5 |
| 1 | 2 | 5 |
| 2 | 2 | 5 |
| 3 | 2 | 5 |
| 4 | 2 | 5 |
| 5 | 2 | 5 |
| 6 | 2 | 5 |
| 7 | 2 | 5 |
| 8 |   |   |
| 9 |   |   |

| y | START x | END x |
|---|---------|-------|
| 0 |         |       |
| 1 |         |       |
| 2 |         |       |
| 3 |         |       |
| 4 |         |       |
| 5 |         |       |
| 6 |         |       |
| 7 |         |       |
| 8 | 2       | 17    |
| 9 | 2       | 17    |

Tb

Tb

| y | START x | END x |
|---|---------|-------|
| 0 | 2 | 17 |
| 1 | 2 | 17 |
| 2 | | |
| 3 | | |
| 4 | | |
| 5 | | |
| 6 | | |
| 7 | | |
| 8 | | |
| 9 | | |

IMAGE PROCESSING APPARATUS AND METHOD

BACKGROUND OF THE INVENTION

1. Field of the Invention

The present invention relates to image processing apparatus and method and, more particularly, to character processing apparatus and method for generating a character pattern on the basis of font data in which one character is constructed by a plurality of strokes and is expressed by parameters on a stroke unit basis.

2. Related Background Art

FIG. 21 is a block diagram showing an example of a conventional image processing apparatus.

The image processing apparatus shown in FIG. 21 comprises an outline coordinate generator 11, an outline data generator 12, an address generator 13, an outline buffer 14, a painter 15, and a bit map memory 16.

In the image processing apparatus shown in FIG. 21, an image process is executed as follows. First, outline coordinates are generated by the outline coordinate generator 11 constructed by a CPU and an ROM for storing an outline coordinate generating program from a parameter data group 10 corresponding to one stroke stored in an ROM or a hard disk. The outline data generator 12 constructed by a CPU and an ROM for storing an outline data generating program generates a start point and an end point of painting on the same (y) coordinate as outline data for painting on the basis of the outline coordinates. The address generator 13 constructed by a CPU and an ROM for storing an address generating program generates the (y) coordinate as an address in the outline buffer 14. The start and end points of painting on the same (y) coordinate are stored into addresses in the outline buffer 14 (RAM) generated by the address generator 13. The above operation is executed with respect to the whole one stroke.

The address generator 13 generates a start address and an end address in the bit map memory (RAM) 16 corresponding to the start and end points of painting on the same (y) coordinate stored in the outline buffer 14. The painter 15 constructed by a CPU and an ROM for storing a painting program writes "1" into all of the data between the start and end addresses in the bit map memory 16. The operation is executed with respect to all of the start and end points stored in the outline buffer 14. The series of operations mentioned above are executed with respect to all of the strokes and the OR of bit map data of each stroke is obtained, thereby generating a character.

For example, each of FIGS. 22, 23, and 24 shows a bit map image of outline coordinates of each of strokes constructing a character "H".

FIGS. 25, 26, and 27 are explanatory diagrams showing the contents in the outline buffer 14 on the basis of the outline coordinates of the bit map images. Each diagram shows a table Tb in which data (range data) of a pair of start point (StartX) and end point (EndX) of painting in each (y) coordinate is written.

As shown in FIGS. 28, 29, and 30, every stroke is painted on the basis of the outline data and the OR is sequentially obtained, thereby generating one character on the bit map memory 16.

As mentioned above, FIGS. 22 to 30 show the case where the size of the outline buffer 14 is enough larger than the width in the (y) axial direction of the stroke.

In the case where the size of the outline buffer 14 is insufficient for the width in the (y) axial direction of the stroke and the outline data of one stroke cannot be stored by one operation, as shown in FIGS. 31 to 36, a series of processes (hereinbelow, called a band process) are repeated a plurality of times. For example, FIG. 31 shows a bit map image when the size in the (y) axial direction of the outline buffer 14 is insufficient for the outline coordinates of one of the strokes constructing the character "H".

In this case, the data of the pair of painting start point (StartX) and end point (EndX) in each (y) coordinate in the outline buffer 14 is as shown in FIG. 32. The painting operation is executed on the basis of the outline data as shown in FIG. 33. As shown in FIG. 34, the coordinates in the (y) axial direction of the stroke are shifted. In this case, the data of the pair of start point (StartX) and end point (EndX) of painting in each (y) coordinate in the outline buffer 14 is as shown in FIG. 35. The painting operation is executed on the basis of the outline data as shown in FIG. 36 and the OR is obtained, thereby generating one stroke in the bit map memory 16.

In this case, in the second and subsequent processes, when the start and end points of painting on the same (y) coordinate are stored into the outline buffer 14, a value obtained by subtracting the size in the (y) axial direction in the outline buffer 14 from the (y) coordinate of the start and end points is used as an address.

FIGS. 37 to 42 show an example of the band process with respect to another stroke.

A flow for processes, specifications of the drawings, and the like of FIGS. 37 to 42 are similar to those described with reference to FIGS. 31 to 36.

In the conventional example of FIGS. 37 to 42, however, although the capacity in the (y) axial direction in the outline buffer 14 is sufficient for the width in the (y) axial direction of the stroke, the band process has to be executed and a processing time increases.

As mentioned above, in the case where the outline buffer cannot store the outline data of one stroke by one operation, a number of band processes have to be executed in the conventional technique, so that the processing time increases. There is a problem such that in order to avoid the occurrence of the band process, the outline buffer having a large capacity sufficient for a size of one character is necessary, so that a large memory capacity is necessary.

SUMMARY OF THE INVENTION

The invention is made in consideration of the above drawbacks and it is an object of the invention to provide image processing apparatus and method which can prevent an increase in processing time due to an occurrence of a band process and enables a character to be efficiently generated by using an outline buffer having a capacity smaller than that of a conventional buffer.

To achieve the above object, there is provided an image processing apparatus in which an image based on an image of each stroke formed by painting every stroke is drawn in a bit map memory, comprising: detecting means for detecting a minimum coordinate value or a maximum coordinate value at least in one direction from a parameter data group corresponding to a stroke to be formed; coordinate processing means for generating outline coordinates from the parameter data group; storing means for storing range data indicative of a painting range into a predetermined address in memory means on the basis of the outline coordinates and the minimum coordinate value or the maximum coordinate value; address generating means for generating a start address and an end address of drawing in the bit map memory in accordance with a value based on the minimum coordinate value or the maximum coordinate value and the predetermined address and with the range data; and painting means for executing the painting operation by writing a same value into data between the drawing start address and the drawing end address in the bit map memory, wherein the storage into the memory means by the storing means, the address generation by the address generating means, and the painting operation by the painting means are repeatedly executed.

According to an apparatus of the present invention, the predetermined address is a differential value between the outline coordinates and the minimum coordinate value or the maximum coordinate value.

According to an apparatus of the present invention, the value based on the minimum coordinate value or the maximum coordinate value and the predetermined address is an addition value of the minimum coordinate value or the maximum coordinate value and the predetermined address.

According to an apparatus of the present invention, the parameter data group further includes outer frame information of the stroke.

According to an apparatus of the present invention, the parameter data group includes a start point, an end point, and a control point of a curve constructing the stroke.

To accomplish the above object, there is provided an image processing method in which an image based on an image of each stroke formed by painting every stroke is drawn in a bit map memory, comprising: a detecting step of detecting a minimum coordinate value or a maximum coordinate value at least in one direction from a parameter data group corresponding to a stroke to be generated; a coordinate processing step of generating outline coordinates from the parameter data group; a storing step of storing range data indicative of a painting range into a predetermined address in memory means on the basis of the outline coordinates and the minimum coordinate value or the maximum coordinate value; an address generating step of generating a start address and an end address of drawing in the bit map memory on the basis of a value based on the minimum coordinate value or the maximum coordinate value and the predetermined address and the range data; and a painting step of executing the painting operation by writing a same value into data between the drawing start address and the drawing end address in the bit map memory, wherein the process in the storing step, the process in the address generating step, and the process in the painting step are repeatedly executed.

According to a method of the present invention, the predetermined address is a differential value between the outline coordinates and the minimum coordinate value or the maximum coordinate value.

According to a method of the present invention, the value based on the minimum coordinate value or the maximum coordinate value and the predetermined address is an addition value of the minimum coordinate value or the maximum coordinate value and the predetermined address.

According to a method of the present invention, the parameter data group further includes outer frame information of the stroke.

According to a method of the present invention, the parameter data group includes a start point, an end point, and a control point of a curve constructing the stroke.

BRIEF DESCRIPTION OF THE DRAWINGS

FIG. 25 is an explanatory diagram (part 1) showing the contents in the outline buffer 14 on the basis of outline coordinates of each bit map image constructing the character "H";

FIG. 26 is an explanatory diagram (part 2) showing the contents in the outline buffer 14 on the basis of outline coordinates of each bit map image constructing the character "H";

FIG. 27 is an explanatory diagram (part 3) showing the contents in the outline buffer 14 on the basis of outline coordinates of each bit map image constructing the character "H";

DETAILED DESCRIPTION OF THE PREFERRED EMBODIMENTS

Embodiments of the invention will now be described in detail hereinbelow with reference to the drawings.

First embodiment

Figure 1:
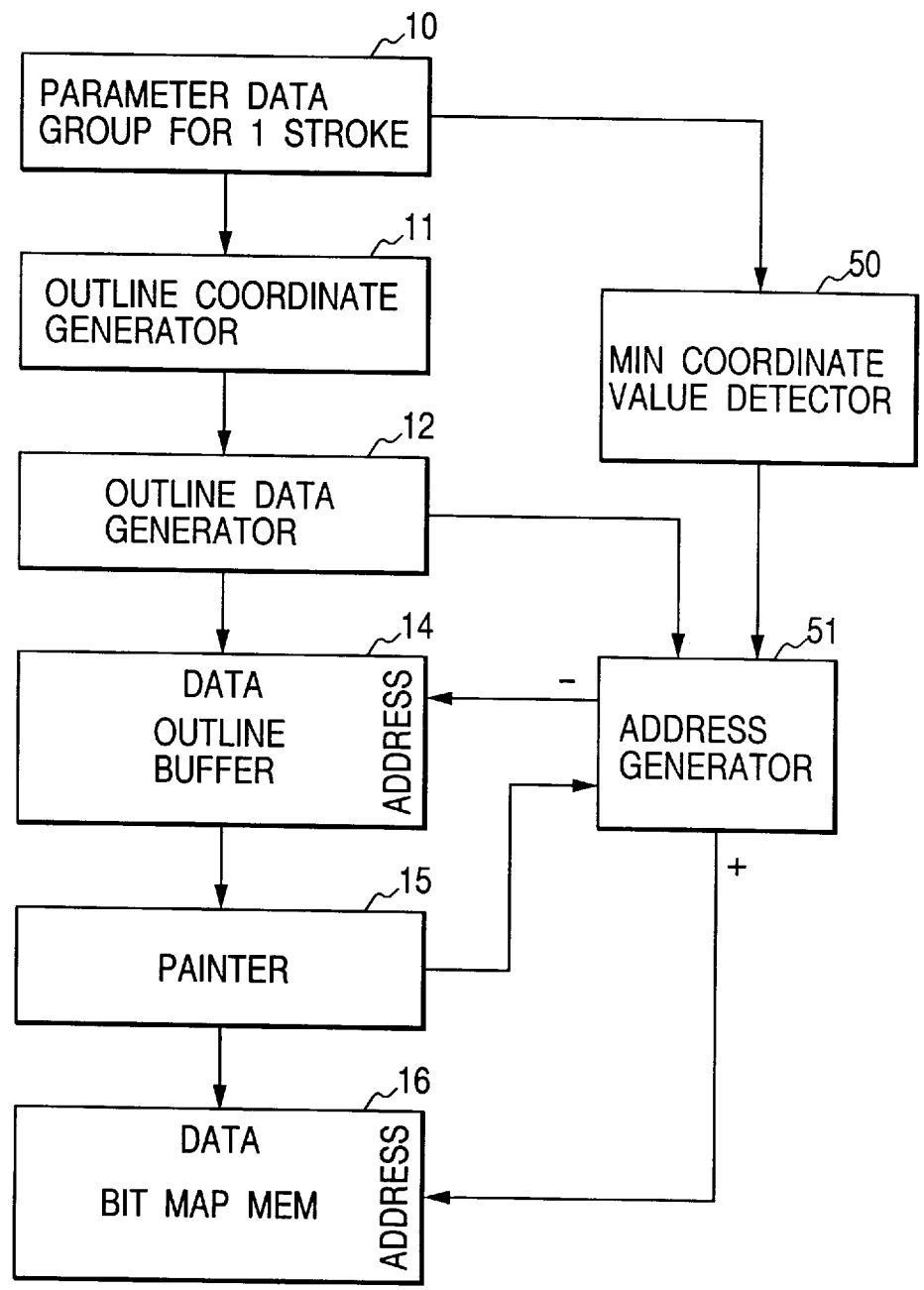
FIG. 1 is a block diagram showing the first embodiment of an image processing apparatus to which the invention is applied.

FIG. 1 is a block diagram showing the first embodiment of an image processing apparatus to which the invention is applied.

Figure 21:
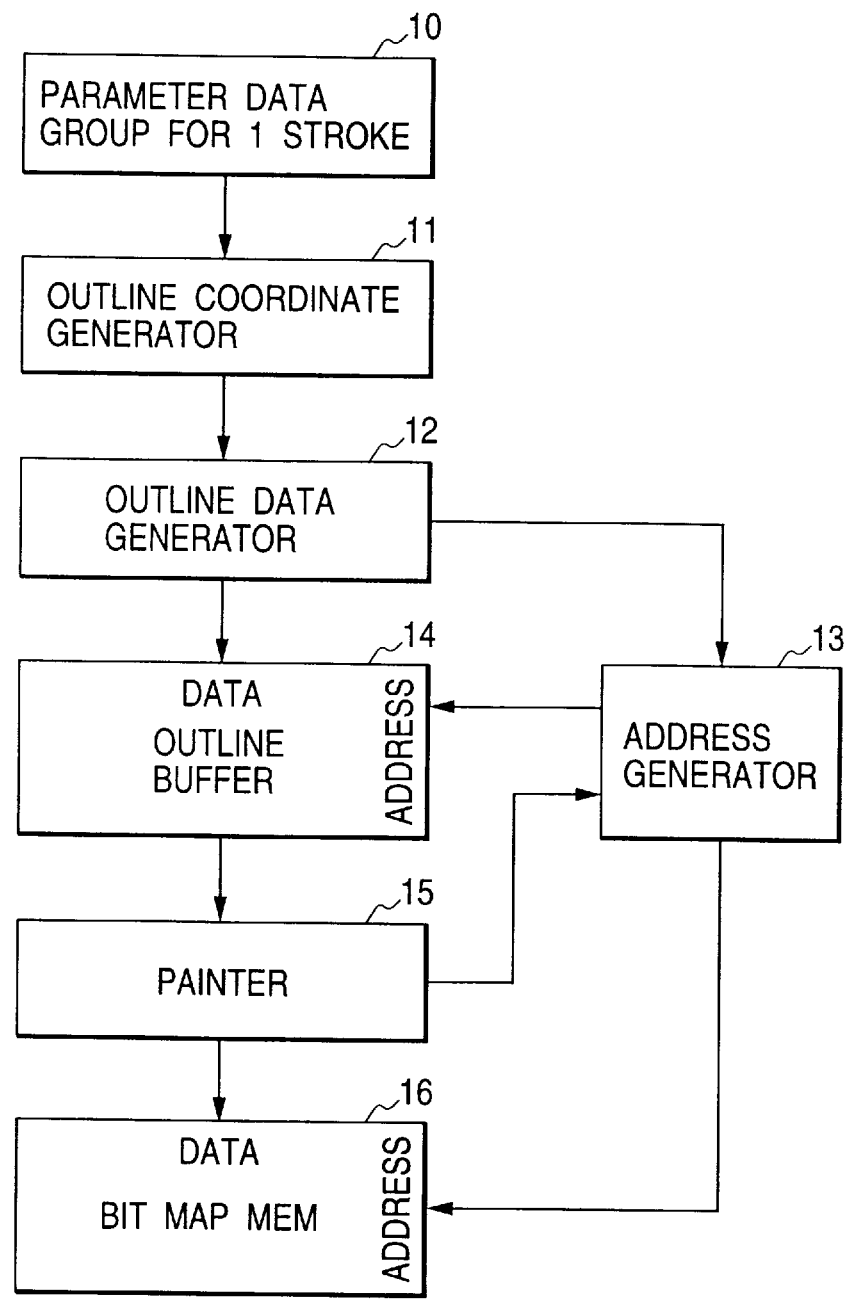
FIG. 21 is a block diagram showing an example of a conventional image processing apparatus.
Figure 23:
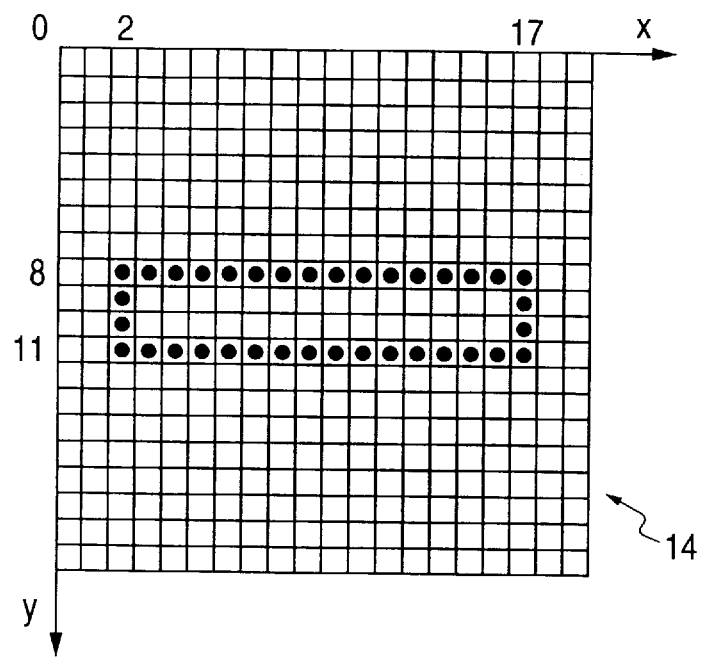
FIG. 23 is an explanatory diagram (part 2) showing a bit map image of outline coordinates of each of strokes constructing the character "H"
Figure 24:
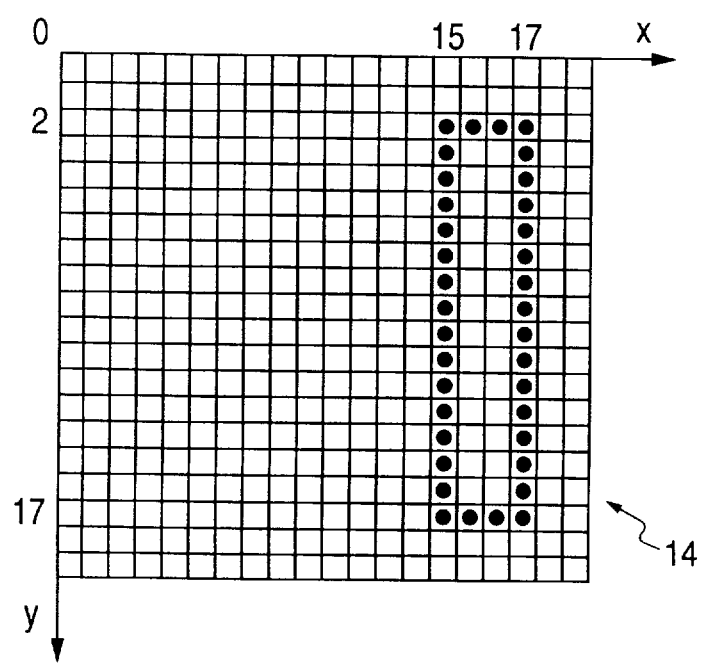
FIG. 24 is an explanatory diagram (part 3) showing a bit map image of outline coordinates of each of strokes constructing the character "H"
Figure 28:
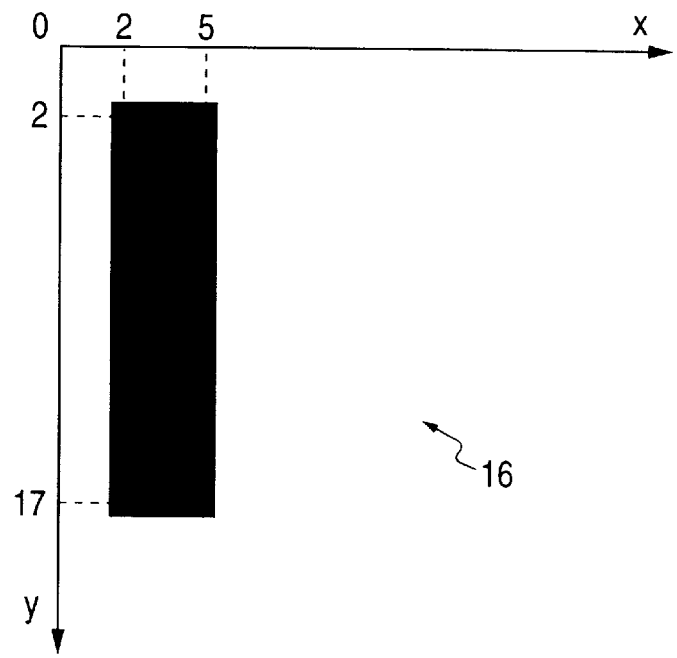
FIG. 28 is a diagram (part 1) showing a procedure in which a painting operation is performed every stroke on the basis of outline data and the OR is sequentially obtained and one character is formed in a bit map memory 16.
Figure 29:
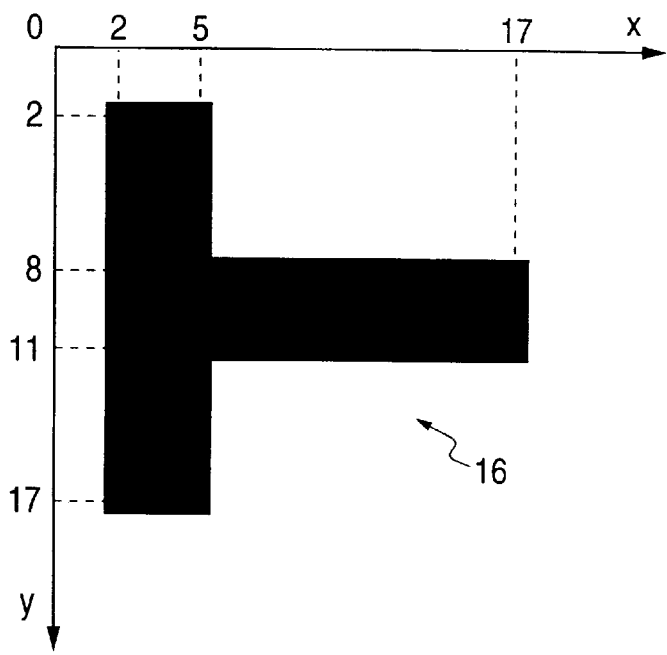
FIG. 29 is a diagram (part 2) showing a procedure in which a painting operation is performed every stroke on the basis of outline data and the OR is sequentially obtained and one character is formed in the bit map memory 16.
Figure 30:
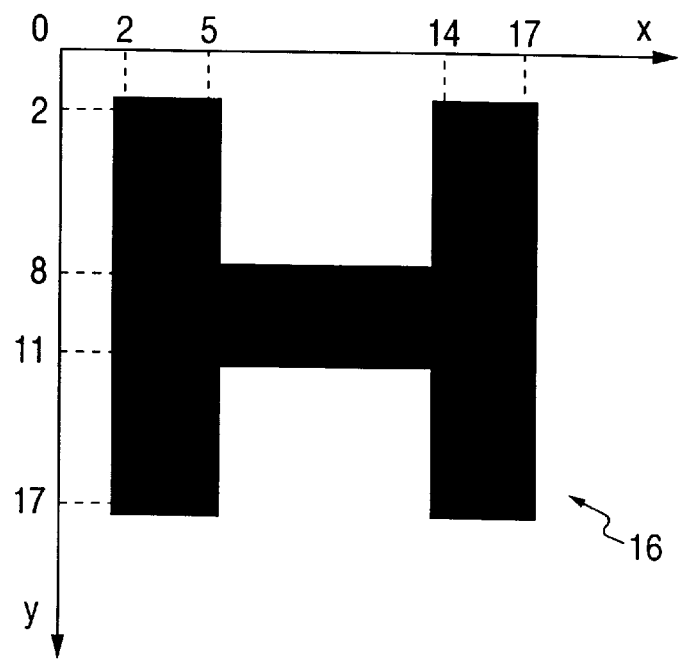
FIG. 30 is a diagram (part 3) showing a procedure in which a painting operation is performed every stroke on the basis of outline data and the OR is sequentially obtained and one character is formed in the bit map memory 16.
Figure 31:
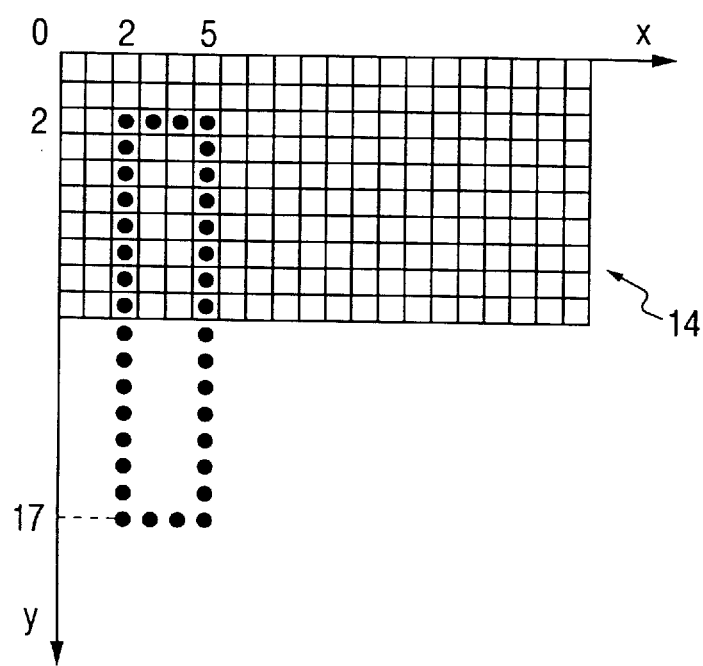
FIG. 31 is an explanatory diagram (part 1) for explaining a band process.
Figures 32, 33:
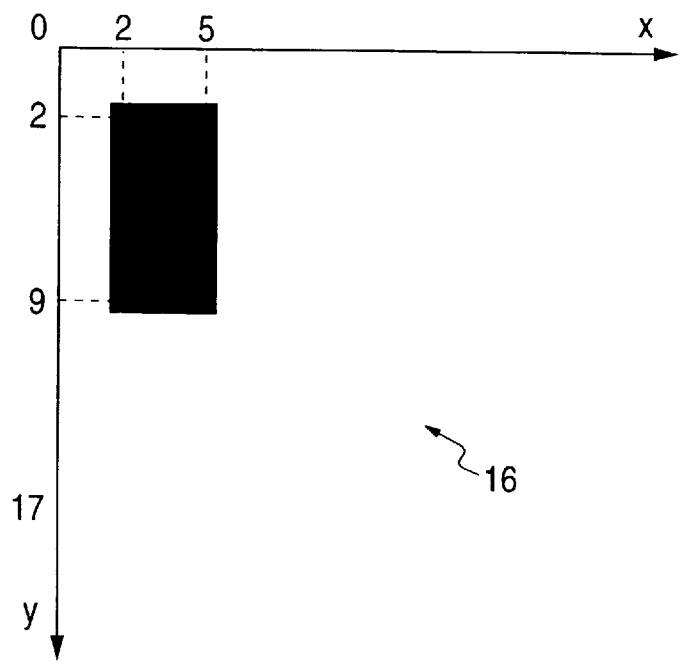
FIG. 32 is an explanatory diagram (part 2) for explaining the band process.
FIG. 33 is an explanatory diagram (part 3) for explaining the band process.
Figures 34, 35:
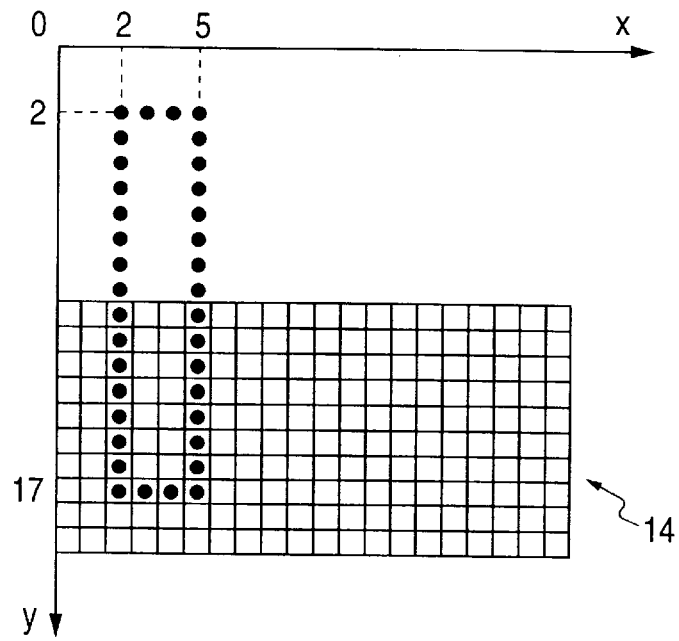
FIG. 34 is an explanatory diagram (part 4) for explaining the band process.
FIG. 35 is an explanatory diagram (part 5) for explaining the band process.
Figure 36:
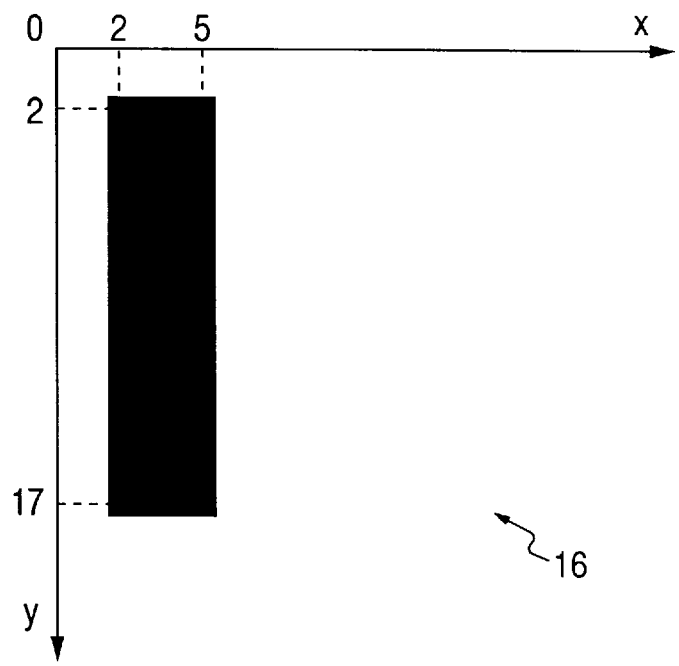
FIG. 36 is an explanatory diagram (part 6) for explaining the band process.
Figure 37:
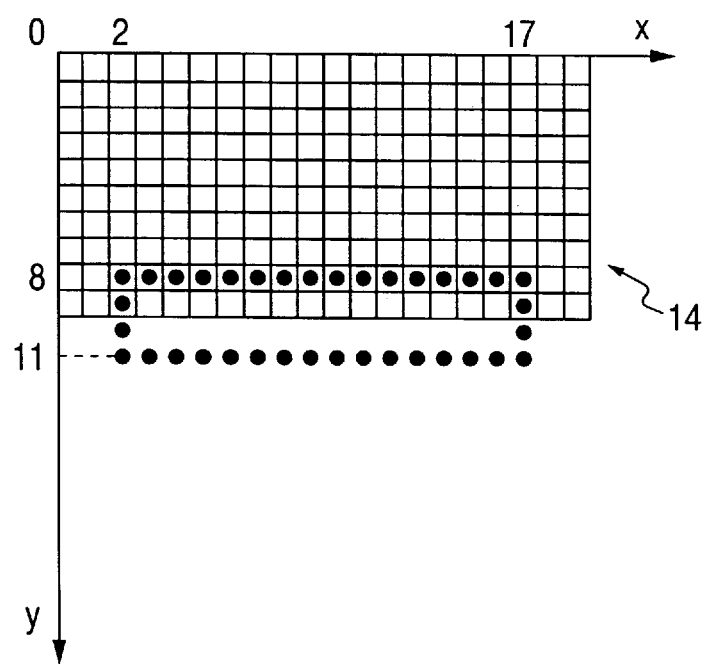
FIG. 37 is an explanatory diagram (part 1) for explaining a band process about another example.
Figures 38, 39:
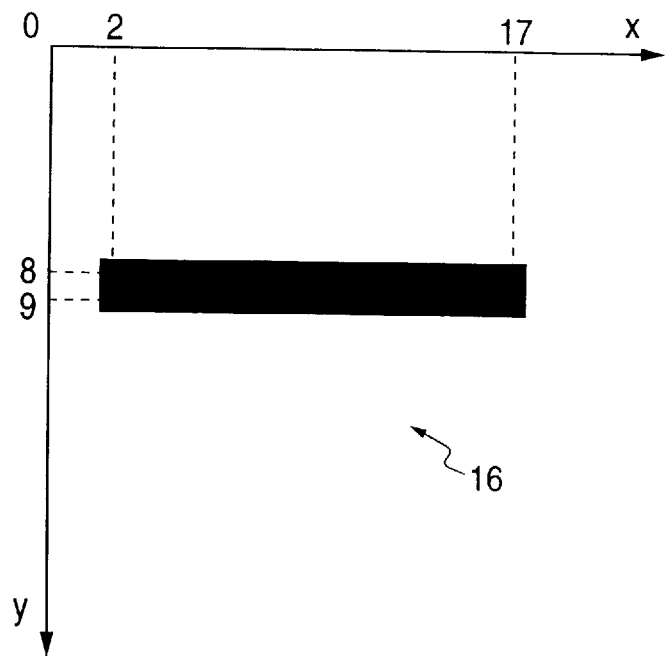
FIG. 38 is an explanatory diagram (part 2) for explaining the band process about another example.
FIG. 39 is an explanatory diagram (part 3) for explaining the band process about another example.
Figures 40, 41:
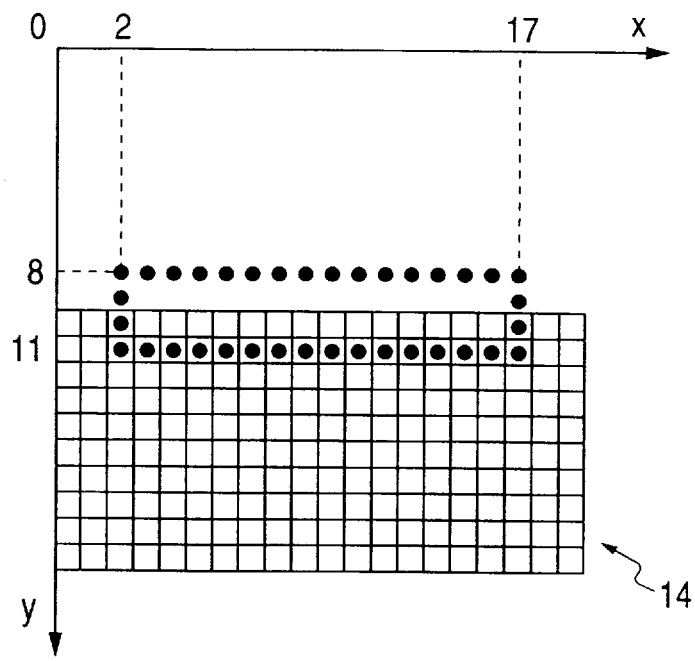
FIG. 40 is an explanatory diagram (part 4) for explaining the band process about another example.
FIG. 41 is an explanatory diagram (part 5) for explaining the band process about another example.
Figure 42:
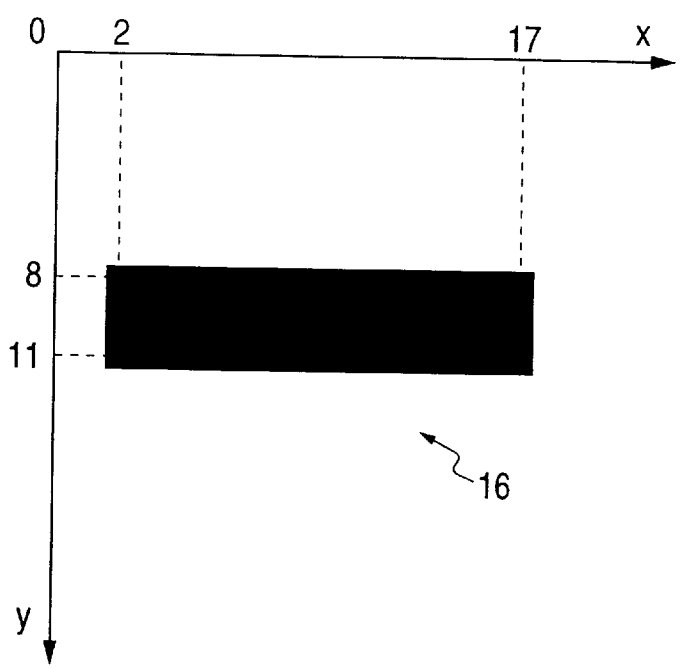
FIG. 42 is an explanatory diagram (part 6) for explaining the band process about another example.

In FIG. 1, the same component portions as those shown in FIG. 21 are designated by the same reference numerals. In the embodiment, a minimum (min) coordinate value detector 50 comprising a CPU and an ROM for storing a minimum coordinate detecting program is newly added. The address generator 13 in FIG. 21 is replaced with an address generator 51. The embodiment of FIG. 1 will now be described with reference to an example of FIGS. 2, 3, 4 and 5.

Figure 2:
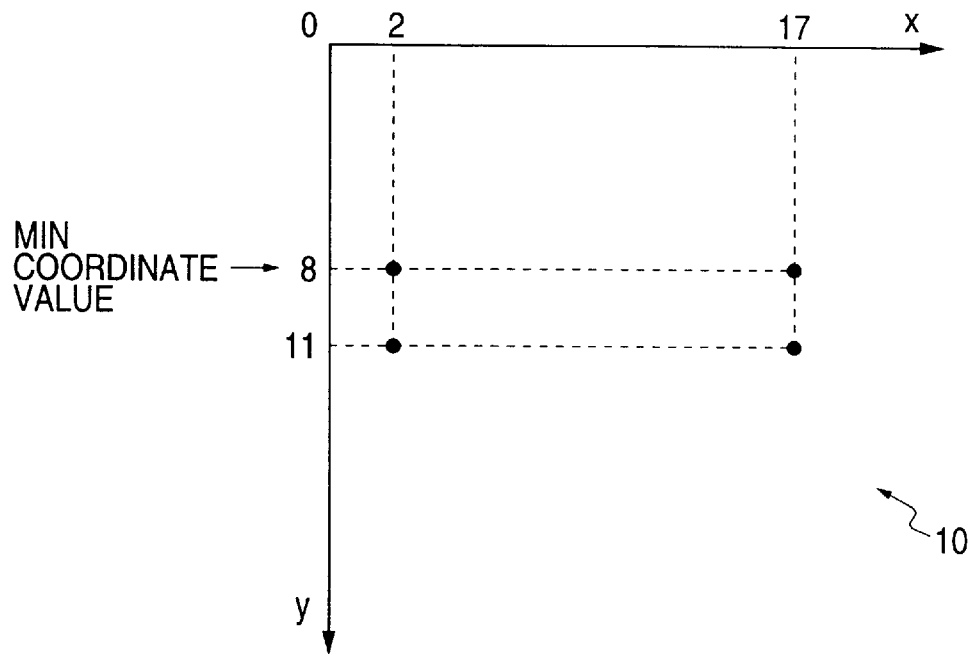
FIG. 2 is a diagram showing a parameter data group of a stroke constructed by one straight line in an (x) direction.
Figure 3:
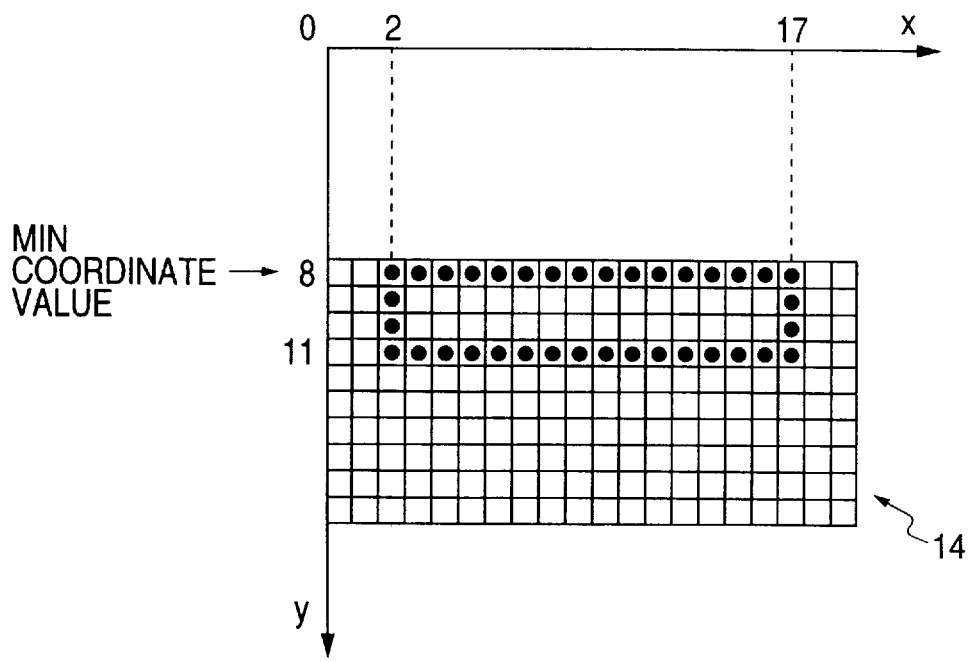
FIG. 3 is an explanatory diagram showing a bit map image of outline coordinates of a stroke constructing a character "-" comprising one straight line.
Figures 4, 5:
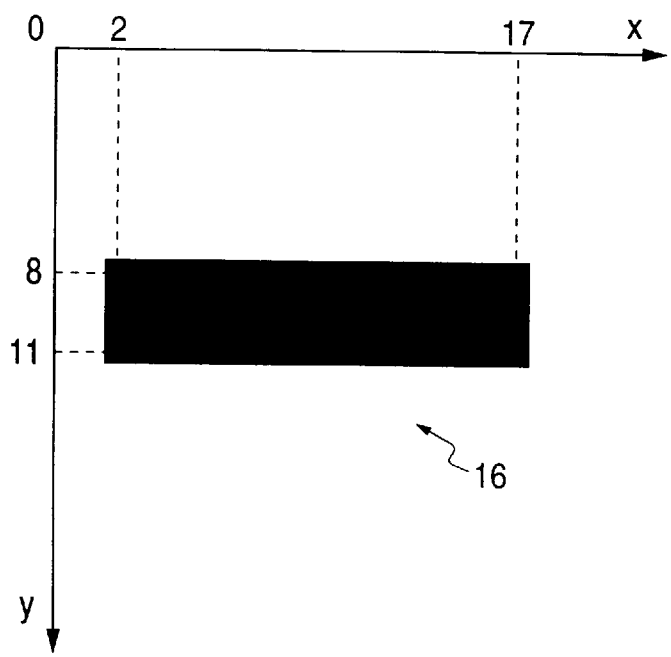
FIG. 4 is an explanatory diagram showing the contents in an outline buffer 14 on the basis of the outline coordinates in the bit map image in FIG. 3.
FIG. 5 is a diagram showing the character "-" drawn on a bit map.

FIG. 2 is a diagram showing a parameter data group of a stroke constructed by one straight line in the (x) direction. FIG. 3 shows a bit map image of outline coordinates of a stroke constructing a character, for example, "-" made up of one straight line. FIG. 4 is a diagram showing the contents (table Tb) in the outline buffer 14 on the basis of the outline coordinates of the bit map image in FIG. 3. FIG. 5 is a diagram showing a character "-" drawn on a bit map.

First, outline coordinates (2 ... 17, 8), (2, 9), (17, 9), (3, 10), (17, 10), and (2 ... 17, 11) are formed by the outline coordinate generator 11 from the parameter data group 10 of one stroke (FIG. 3). The minimum coordinate value (8) in the (y) direction is detected by the min coordinate value detector 50 from the parameter data group 10 (FIG. 2). Subsequently, the outline data generator 12 generates a painting start point and an end point as outline data for painting on the basis of the outline coordinates. The address generator 51 generates a difference value between the outline coordinates and the minimum coordinate value as an address in the outline buffer 14. The start and end points are stored in pair at the address in the outline buffer 14. FIG. 4 shows a table Tb in which the data of the pair of painting start point (StartX) and end point (EndX) in each (y) coordinate. Since the table Tb is disclosed in a manner similar to the conventional one, its explanation is omitted hereinbelow. The above operations are executed with regard to a whole portion of one stroke.

The address generator 51 generates a start address and an end address in the bit map memory 16 on the basis of an addition value of the minimum coordinate value and the address in the outline buffer 14 and the start and end points. Subsequently, the painter 15 writes "1" into all data between the start and end addresses in the bit map memory 16 (FIG. 5). The series of operations are executed with respect to all of the strokes and the OR of the bit map data of each stroke is obtained, thereby generating a character.

As shown in FIGS. 2 to 5, in the embodiment, the band process doesn't occur with respect to the stroke (FIGS. 37 to 42) shown in the conventional example and the bit map data is derived by the process of one time.

FIGS. 2 to 5 show a case where the size of outline buffer 14 is enough for the width in the (y) axial direction of the stroke. A case where the width in the (y) axial direction of the stroke is further large and the outline data of one stroke cannot be stored by the process of one time will now be described hereinbelow.

Second embodiment

The embodiment is realized by a block construction similar to that of FIG. 1.

Figure 6:
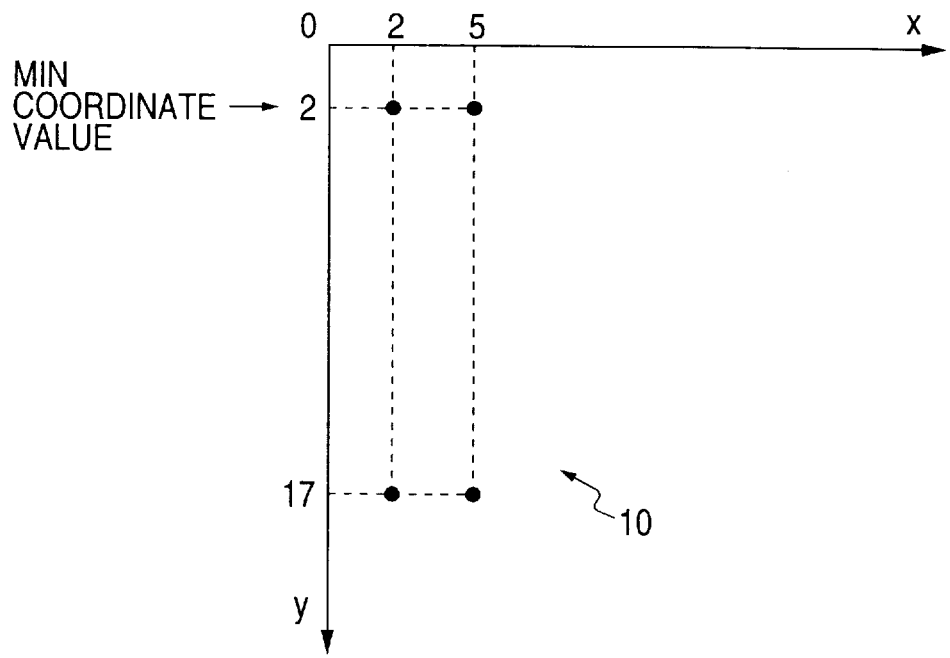
FIG. 6 is a diagram showing a parameter data group of a stroke constructing by one straight line in a (y) direction.
Figure 7:
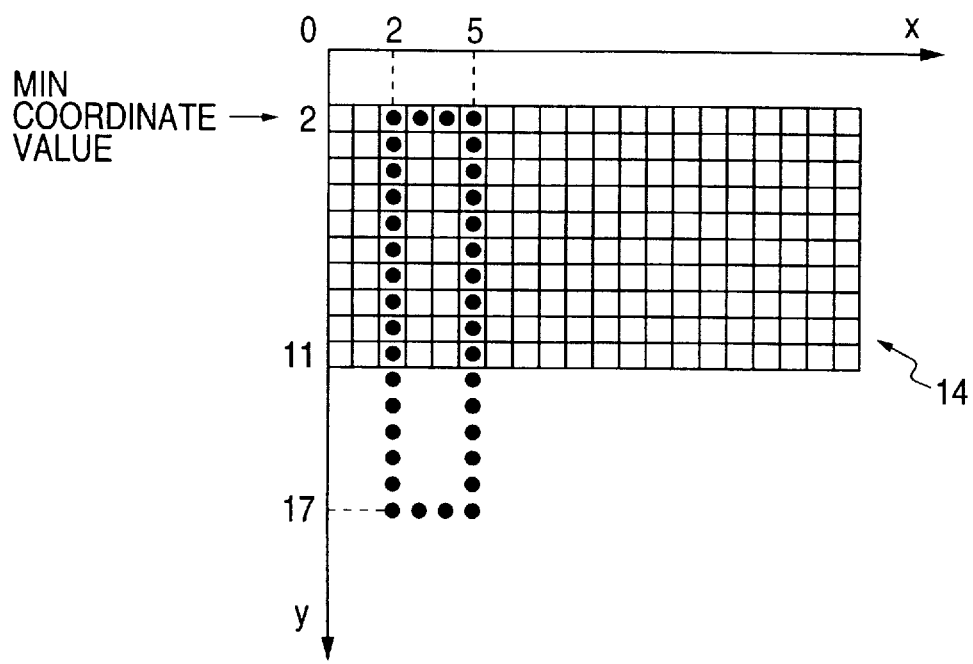
FIG. 7 is an explanatory diagram showing a bit map image of outline coordinates of one stroke constructing, for example, a character "H"
Figures 8, 9:
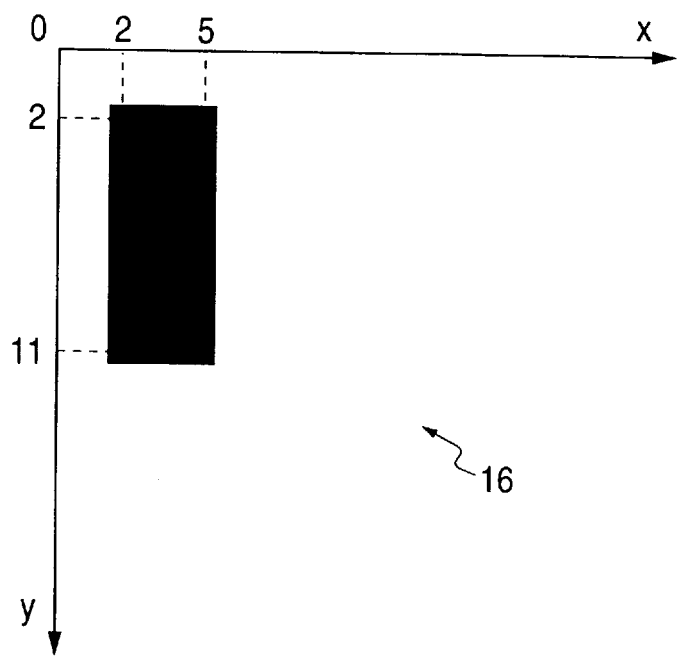
FIG. 8 is an explanatory diagram showing the contents in the outline buffer 14 on the basis of the outline coordinates of the bit map image in FIG. 7.
FIG. 9 is a diagram showing a part of one stroke in the (y) direction drawn on a bit map.
Figures 10, 11:
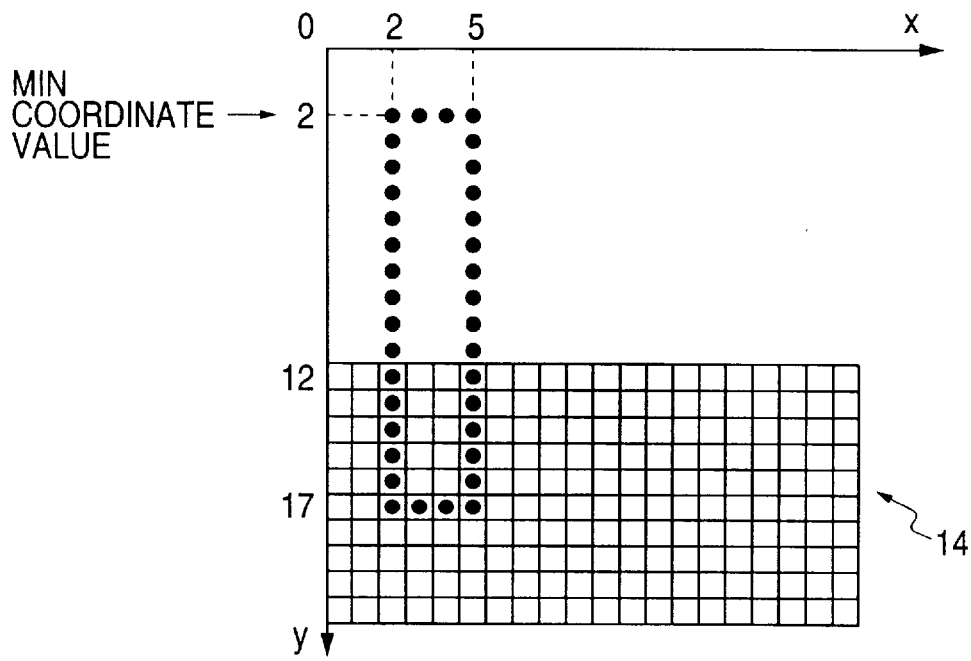
FIG. 10 is an explanatory diagram showing a bit map image of outline coordinates of one stroke constructing, for example, a character "H"
FIG. 11 is an explanatory diagram showing the contents in the outline buffer 14 on the basis of the outline coordinates of the bit map image in FIG. 10.
Figure 12:
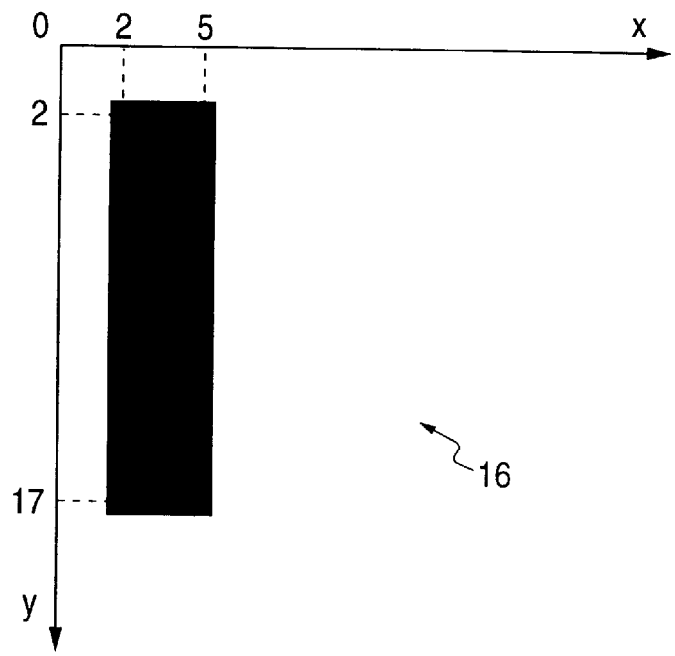
FIG. 12 is a diagram showing a whole portion of one stroke drawn on a bit map.

FIG. 6 is a diagram showing a parameter data group of a stroke constructed by one straight line in the (y) direction. FIG. 7 shows a bit map image of outline coordinates of one of a plurality of strokes constructing, for instance, a character "H". FIG. 8 is an explanatory diagram showing the contents (table Tb1) in the outline buffer 14 on the basis of the outline coordinates of the bit map image of FIG. 7. FIG. 9 is a diagram showing a part of one stroke in the (y) direction drawn on a bit map. FIG. 10 shows a bit map image of outline coordinates of one of a plurality of strokes constructing, for example, a character "H". FIG. 11 is an explanatory diagram showing the contents (table Tb2) in the outline buffer 14 on the basis of the outline coordinates of the bit map image in FIG. 10. FIG. 12 is a diagram showing a whole portion of one stroke drawn on a bit map.

In the embodiment, band processes shown in FIGS. 6 to 12 are executed. In the process of the first time in FIGS. 7 to 9, the processes similar to those in the first embodiment are executed with respect to the maximum range in the (y) direction in the outline buffer 14 from the minimum coordinate value (2) in the (y) direction of one stroke constructing the character "H". A part of one stroke in the (y) direction is drawn as shown in FIG. 9.

In the processes of the second and subsequent times in FIGS. 10 to 12, the address of a value obtained by subtracting the size in the (y) direction of the outline buffer 14 from a difference value between the outline coordinates and the minimum coordinate value is used when the start and end points are stored into the outline buffer 14. That is, the table Tb2 about the remaining portion of one stroke constructing the character "H" shown in FIG. 10 is as shown in FIG. 11. By drawing into the bit map memory 16 by using the address of a value obtained by subtracting the size in the (y) direction of the outline buffer 14 from the difference value between the outline coordinates and the minimum coordinate value, the whole portion of one stroke is drawn as shown in FIG. 12.

According to the embodiment as mentioned above, in case of using the outline buffer smaller than the character size, there is an effect such that the number of times of the band process can be reduced as compared with the conventional one.

Although the number of processing times is equal to 2 in the embodiment, the band process of three or more times can be also performed in accordance with the size of character or the capacity of the outline buffer.

Third embodiment

The embodiment is realized by a block construction similar to that of FIG. 1. In the embodiment, a parameter data group as a processing target includes a start point, an end point, and a control point of a curve.

Figure 13:
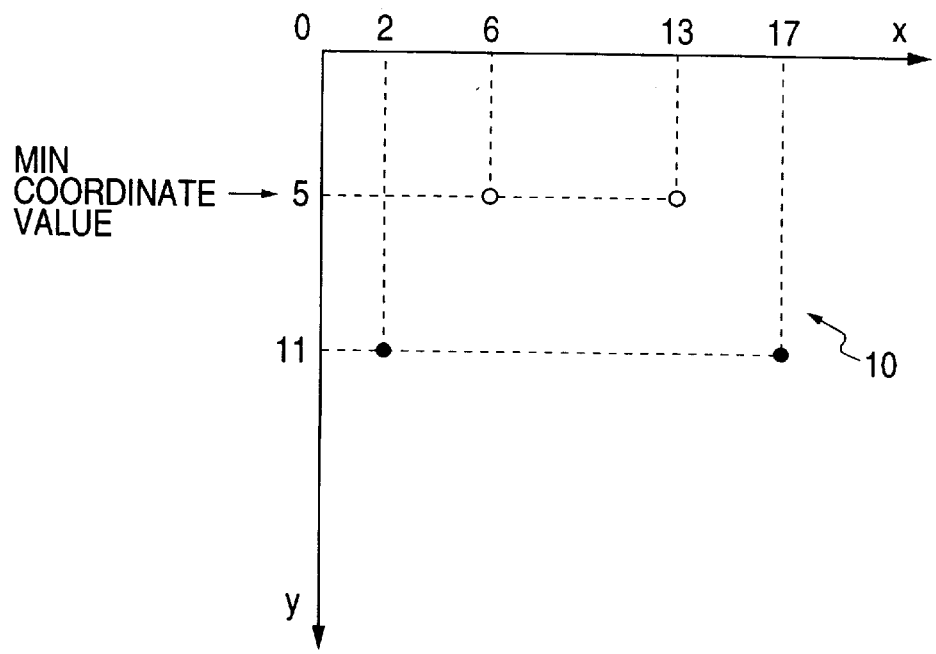
FIG. 13 is a diagram showing a parameter data group of a stroke constructed by one Bezier curve and one straight line in the (x) direction.

FIG. 13 is a diagram showing a parameter data group of a stroke constructed by one Bezier curve and one straight line in the (x) direction. In FIG. 13, black dots indicates a start point and an end point which are shared by the Bezier curve and the horizontal straight line and a white circle indicates a control point of the Bezier curve.

Figures 14, 15:
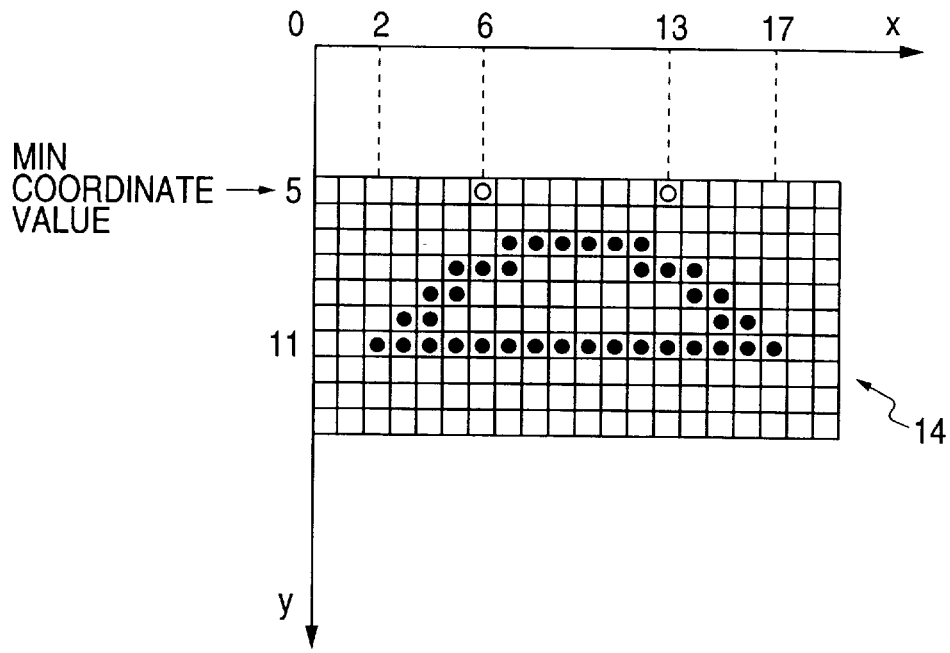
FIG. 14 is an explanatory diagram showing a bit map image of outline coordinates for a parameter data group of the Bezier curve.
FIG. 15 is an explanatory diagram showing the contents in the outline buffer 14 on the basis of the outline coordinates of the bit map image in FIG. 14.
Figure 16:
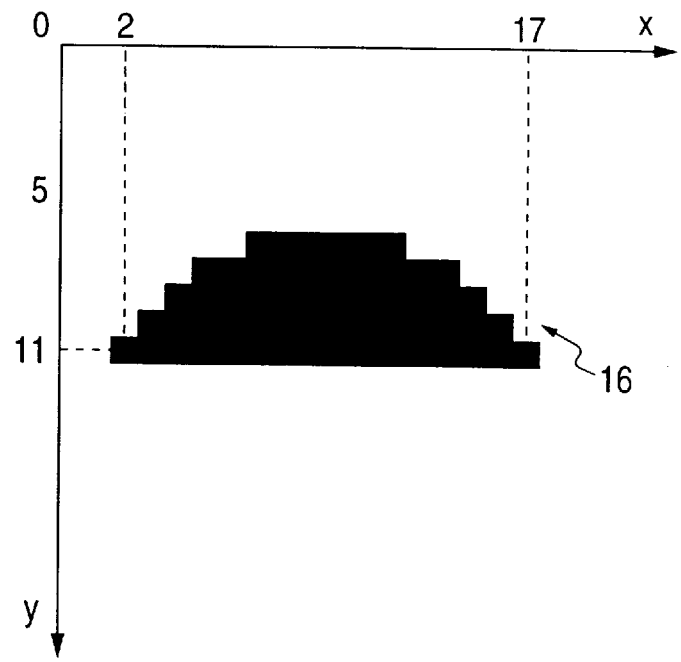
FIG. 16 is a drawing on a bit map in which a range surrounded by the Bezier curb and one straight line in the (x) direction is painted.

FIG. 14 is an explanatory diagram showing a bit map image of outline coordinates for the parameter data group of the Bezier curve. FIG. 15 is an explanatory diagram showing the contents (table Tb) in the outline buffer 14 on the basis of the outline coordinates of the bit map image in FIG. 14. FIG. 16 is a drawing on a bit map in which a range surrounded by the Bezier curve and one straight line in the (x) direction is painted.

First, outline coordinates are generated by the outline coordinate generator 11 by using the parameter data group 10 of one stroke (FIG. 14). In this instance, the control points are included in a region of the outline buffer 14.

On the other hand, the minimum coordinate value (5) in the (y) direction is detected by the min coordinate value detector 50 from the parameter data 10. In FIG. 13, the y coordinate of the control point of the Bezier curve is detected as a minimum coordinate value. Subsequent processes shown in FIGS. 15 and 16 are similar to those described by using FIGS. 4 and 5.

That is, a painting start point and an end point as outline data for painting are generated by the outline data generator 12 on the basis of the outline coordinates. The address generator 51 generates a difference value between the outline coordinates and the minimum coordinate value as an address in the outline buffer 14. The start and end points are stored in pair at the address in the outline buffer 14. FIG. 15 shows a table Tb describing the data of the pair of painting start point (StartX) and end point (EndX) in each (y) coordinate. The above operations are executed with respect to the whole portion of one stroke.

The address generator 51 subsequently generates a start and end addresses in the bit map memory 16 on the basis of an addition value of the minimum coordinate value and the address in the outline buffer 14 and the start and end points. The painter 15 writes "1" into all data between the start and end addresses in the bit map memory 16 (FIG. 16). The series of operations are carried out with regard to all of the strokes and the OR of the bit map data of each stroke is obtained, thereby generating a character into the bit map memory 16.

Fourth embodiment

The embodiment is realized by a block construction similar to FIG. 1. In the embodiment, a parameter data group as a processing target includes outer frame information.

Figure 17:
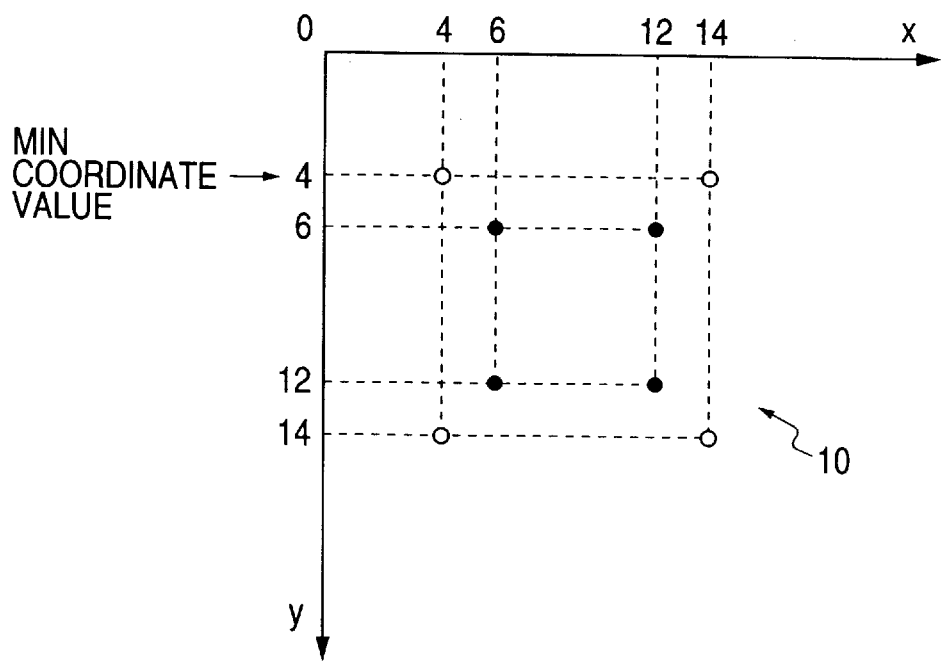
FIG. 17 is a diagram showing a parameter data group of a stroke constructed by four straight lines.
Figures 18, 19:
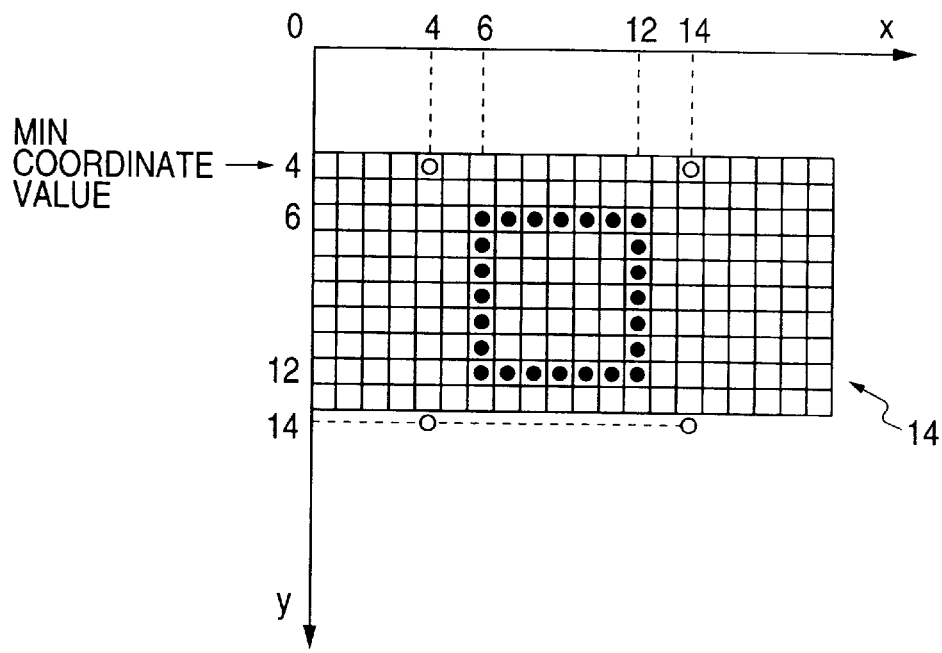
FIG. 18 is an explanatory diagram showing a bit map image of outline coordinates for the parameter data group in FIG. 17.
FIG. 19 is an explanatory diagram showing the contents in the outline buffer 14 on the basis of the outline coordinates of the bit map image in FIG. 18.
Figure 20:
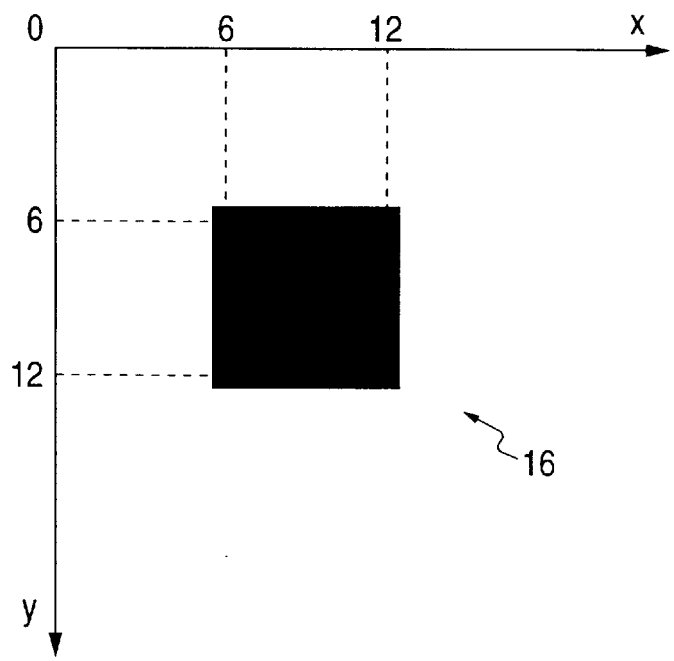
FIG. 20 is a drawing on a bit map in which a range surrounded by four straight lines is painted.
Figure 22:
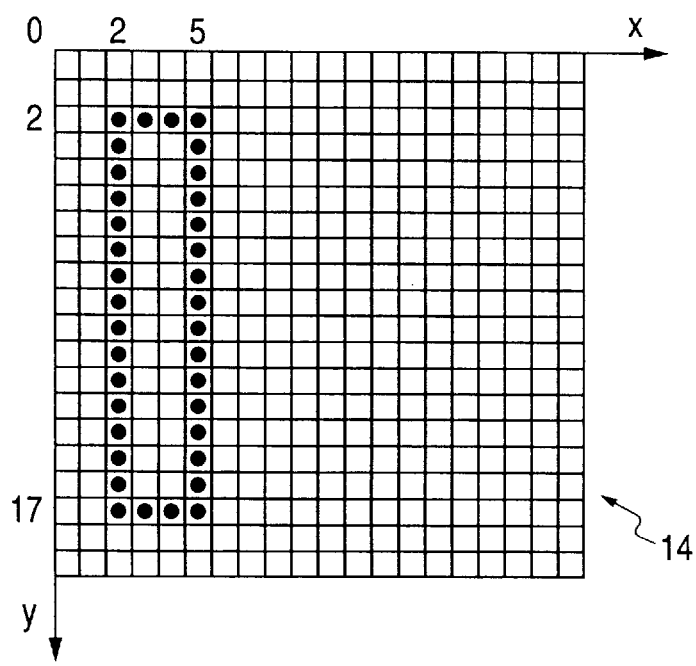
FIG. 22 is an explanatory diagram (part 1) showing a bit map image of outline coordinates of each of strokes constructing the character "H"

FIG. 17 is a diagram showing a parameter data group of a stroke constructed by four straight lines. In FIG. 17, black dots indicate a start point and an end point of a straight line and a white circle indicates a point indicative of outer frame information. FIG. 18 is an explanatory diagram showing a bit map image of outline coordinates for the parameter data group of FIG. 17. FIG. 19 is an explanatory diagram showing the contents (table Tb) in the outline buffer 14 on the basis of the outline coordinates of the bit map image in FIG. 18. FIG. 20 is a drawing on a bit map in which a range surrounded by four straight lines is painted.

First, outline coordinates are generated by the outline coordinate generator 11 as shown in FIG. 18 by using the parameter data group 10 of one stroke in FIG. 17. In this instance, the outer frame information of the minimum coordinate value (4) in the (y) direction is included in the region in the outline buffer 14. The outer frame information of the coordinate value (14) in the (y) direction is not included in the region in the outline buffer 14. The min coordinate value detector 50 detects the minimum coordinate value in the (y) direction from the outer frame information (FIG. 17). In this case, the minimum coordinate value can be detected without evaluating all of the parameter data groups. Subsequent processes shown in FIGS. 19 and 20 are similar to those described in FIGS. 4 and 5.

That is, the outline data generator 12 generates a painting start point and an end point as outline data for painting on the basis of the outline coordinates. The address generator 51 generates a difference value between the outline coordinates and the minimum coordinate value as an address in the outline buffer 14. The start and end points are stored in pair at the address in the outline buffer 14. FIG. 19 shows a table Tb describing the data of the pair of painting start point (StartX) and end point (EndX) in each (y) coordinate. The above operations are executed with respect to a whole portion of one stroke.

The address generator 51 subsequently generates start and end addresses in the bit map memory 16 on the basis of an addition value of the minimum coordinate value and the address in the outline buffer 14 and the start and end points. The painter 15 writes "1" into all data between the start and end addresses in the bit map memory 16 (FIG. 20). The series of operations are performed with respect to all of the strokes and the OR of the bit map data of each stroke is obtained, thereby generating a character into the bit map memory 16.

Although the min coordinate value detector 50 has been used in each of the above embodiments, a similar effect can be also derived with a construction using a maximum coordinate value detector in place of it. Although the case of generating the character has been described in each of the foregoing embodiments, the invention is not limited to characters but can be also applied to other patterns. In each of the embodiments of the invention, although each unit is made up of the CPU and the ROM to store each program and is realized by software, it can be also replaced with exclusive-use hardware.

The parameter data group in each of the embodiments of the invention can be also replaced with font data comprising core line information and thickness information. The character pattern developed in the bit map memory in each of the embodiments of the invention is outputted by a printer and a display.

According to the image processing apparatus and method of the invention as described above, the minimum coordinate value or maximum coordinate value at least in one direction in the parameter data group including a start point and an end point of each stroke constructed by a plurality of strokes is detected, the outline coordinates are generated from the parameter data group, the range data indicative of the painting range is stored into the predetermined address in the memory means on the basis of the outline coordinates and the minimum coordinate value or the maximum coordinate value, the drawing start address and end address in the bit map memory are formed in accordance with the values based on the minimum coordinate value or maximum coordinate value and the predetermined address and with the range data, and the painting operation to paint by writing the same value into all data between the drawing start address and end address in the bit map memory is repetitively executed, so that when the memory means smaller than the character size is used, the number of band processing times can be reduced as compared with the conventional one. Generally, in particular, in a Chinese character, since the size of stroke is sufficiently smaller than the character size, the effect derived by the apparatus and method of the invention is extremely large. There is, consequently, a feature such that it is possible to obtain an effect that characters can be efficiently generated in a short time even by using the memory means of a small capacity.

What is claimed is:

1. An image processing apparatus in which an image based on an image of each stroke formed by painting every stroke is drawn into a bit map memory, comprising:

detecting means for detecting a minimum coordinate value or a maximum coordinate value at least in one direction from a parameter data group corresponding to the stroke to be formed;

coordinate processing means for forming outline coordinates from said parameter data group;

storing means for storing range data indicative of a painting range into a predetermined address in memory means on the basis of said outline coordinates and said minimum coordinate value or said maximum coordinate value;

address generating means for generating a drawing start address and an end address in said bit map memory in accordance with a value based on said minimum coordinate value or said maximum coordinate value and said predetermined address and with said range data; and painting means for performing said painting by writing a same value into data between said drawing start address and said end address in said bit map memory, wherein the storage into said memory means by said storing means, the address generation by said address generating means, and the painting by said painting means are repetitively executed.

2. An apparatus according to claim 1, wherein said predetermined address is a difference value between said outline coordinates and said minimum coordinate value or said maximum coordinate value.

3. An apparatus according to claim 1, wherein said value based on said minimum coordinate value or said maximum coordinate value and said predetermined address is an addition value of said minimum coordinate value or said maximum coordinate value and said predetermined address.

4. An apparatus according to claim 1, wherein said parameter data group further includes outer frame information of said stroke.

5. An apparatus according to claim 4, wherein said parameter data group includes a start point, an end point, and a control point of a curve constructing said stroke.

6. An apparatus according to claim 1, wherein said parameter data group includes a start point, an end point, and a control point of a curve constructing said stroke.

7. An image processing method whereby an image based on an image of each stroke formed by painting every stroke is drawn into a bit map memory, comprising:

a detecting step of detecting a minimum coordinate value or a maximum coordinate value at least in one direction from a parameter data group corresponding to the stroke to be formed;

a coordinate processing step of forming outline coordinates from said parameter data group;

a storing step of storing range data indicative of a painting range into a predetermined address in memory means on the basis of said outline coordinates and said minimum coordinate value or said maximum coordinate value;

an address generating step of generating a drawing start address and an end address in said bit map memory in accordance with a value based on the minimum coordinate value or said maximum coordinate value and said predetermined address and with said range data; and a painting step of performing said painting by writing a same value into data between said drawing start address and said end address in said bit map memory, wherein the process in said storing step, the process in said address generating step, and the process in said painting step are repetitively executed.

8. A method according to claim 7, wherein said predetermined address is a difference value between said outline coordinates and said minimum coordinate value or said maximum coordinate value.

9. A method according to claim 7, wherein said value based on said minimum coordinate value or said maximum coordinate value and said predetermined address is an addition value of said minimum coordinate value or said maximum coordinate value and said predetermined address.

10. A method according to claim 7, wherein said parameter data group further includes outer frame information of said stroke.

11. A method according to claim 10, wherein said parameter data group includes a start point, an end point, and a control point of a curve constructing said stroke.

12. A method according to claim 7, wherein said parameter data group includes a start point, an end point, and a control point of a curve constructing said stroke.

* * * * *